United States Patent
Siegling et al.

(10) Patent No.: US 10,821,881 B2
(45) Date of Patent: Nov. 3, 2020

(54) DETERMINING A STEERING ANGLE FOR AN AUTOMOBILE APPLICATION

(71) Applicant: FORD GLOBAL TECHNOLOGIES, LLC, Dearborn, MI (US)

(72) Inventors: Sebastian Siegling, Cologne NRW (DE); Sebastian Leitermann, Erftstadt NRW (DE)

(73) Assignee: Ford Global Technologies, LLC, Dearborn, MI (US)

(*) Notice: Subject to any disclaimer, the term of this patent is extended or adjusted under 35 U.S.C. 154(b) by 286 days.

(21) Appl. No.: 16/024,249

(22) Filed: Jun. 29, 2018

(65) Prior Publication Data
US 2019/0009708 A1    Jan. 10, 2019

(30) Foreign Application Priority Data
Jul. 5, 2017  (DE) .................. 10 2017 211 428

(51) Int. Cl.
*B60Q 1/12* (2006.01)
*B62D 15/02* (2006.01)
*B60Q 1/08* (2006.01)

(52) U.S. Cl.
CPC .............. *B60Q 1/12* (2013.01); *B60Q 1/085* (2013.01); *B62D 15/024* (2013.01); *B62D 15/0245* (2013.01); *B60Q 2300/112* (2013.01); *B60Q 2300/122* (2013.01); *B60Q 2300/134* (2013.01)

(58) Field of Classification Search
CPC ........................................................ B60Q 1/12
See application file for complete search history.

(56) References Cited

U.S. PATENT DOCUMENTS

| | | | |
|---|---|---|---|
| 6,427,102 B1* | 7/2002 | Ding | B60T 8/1755 |
| | | | 701/29.2 |
| 6,466,848 B2 | 10/2002 | Ozaki | |
| 9,096,256 B2 | 8/2015 | Jang et al. | |
| 9,193,386 B2* | 11/2015 | Wei | B62D 5/0493 |
| 2004/0061500 A1* | 4/2004 | Lou | B62D 15/0245 |
| | | | 324/332 |
| 2005/0169000 A1* | 8/2005 | Hasegawa | B60Q 1/085 |
| | | | 362/466 |

(Continued)

FOREIGN PATENT DOCUMENTS

| | | |
|---|---|---|
| DE | 102006048503 A1 | 4/2008 |
| DE | 102007021625 A1 | 11/2008 |

*Primary Examiner* — Alex C Dunn
(74) *Attorney, Agent, or Firm* — Brooks Kushman P.C.; Frank Lotto

(57) ABSTRACT

A method to operate a motor vehicle having a number of wheels is described. The method determines a steering angle for an automotive application. A steering angle δ is estimated using a yaw rate ω, a revolution rate of at least one wheel, a wheelbase L and a characteristic speed of the vehicle $v_{ch}$ based on a single-track model. Preferably, the steering angle is calculated using the yaw rate ω, the selected gear i, the wheelbase L, the speed v and the characteristic speed of the vehicle $v_{ch}$ according to the formula $\delta=[\omega*i*L*(1+v^2/v_{ch}^2)]/v$. An application, such as adaptive light control during turns, that requires knowledge of the steering angle of the motor vehicle is carried out based on an estimated steering angle.

14 Claims, 3 Drawing Sheets

(56) References Cited

U.S. PATENT DOCUMENTS

| | | | |
|---|---|---|---|
| 2009/0125187 A1 | 5/2009 | Yamamoto et al. | |
| 2009/0248251 A1* | 10/2009 | Sugimoto | B60Q 1/085 |
| | | | 701/42 |
| 2010/0010701 A1* | 1/2010 | Gartner | B62D 6/005 |
| | | | 701/31.4 |
| 2010/0030428 A1* | 2/2010 | Gartner | B62D 15/0245 |
| | | | 701/42 |
| 2010/0235052 A1* | 9/2010 | Shartle | B62D 6/002 |
| | | | 701/41 |
| 2011/0301815 A1* | 12/2011 | Koukes | B60T 8/1755 |
| | | | 701/42 |
| 2013/0144476 A1* | 6/2013 | Pinto | B60T 8/17555 |
| | | | 701/22 |
| 2014/0142810 A1* | 5/2014 | Watanabe | B62D 15/0245 |
| | | | 701/41 |
| 2015/0120134 A1* | 4/2015 | Kanou | B62D 15/0245 |
| | | | 701/34.4 |
| 2015/0120139 A1* | 4/2015 | Yamada | B62D 6/005 |
| | | | 701/41 |
| 2015/0291214 A1* | 10/2015 | Mitsumoto | B62D 5/0457 |
| | | | 701/41 |
| 2016/0257336 A1* | 9/2016 | Nakamura | B62D 6/002 |
| 2016/0362128 A1* | 12/2016 | Sugawara | B62D 15/0215 |
| 2017/0334482 A1* | 11/2017 | Kojima | G01B 21/22 |
| 2018/0043820 A1* | 2/2018 | Murakami | H05B 45/14 |
| 2018/0046138 A1* | 2/2018 | Christmas | F21S 41/25 |
| 2018/0186372 A1* | 7/2018 | Shimizu | B62D 6/08 |
| 2018/0208235 A1* | 7/2018 | Miyashita | B62D 5/003 |
| 2019/0077404 A1* | 3/2019 | Takeda | G08G 1/16 |

* cited by examiner

DETERMINING A STEERING ANGLE FOR AN AUTOMOBILE APPLICATION

CROSS-REFERENCE TO RELATED APPLICATIONS

This application claims foreign priority benefits under 35 U.S.C. § 119(a)-(d) to DE Application 10 2017 211 428.2 filed Jul. 5, 2017, which is hereby incorporated by reference in its entirety.

TECHNICAL FIELD

The present disclosure concerns a method and device for adaptive light control and to estimate a steering angle of a motor vehicle.

BACKGROUND

In the context of various applications for motor vehicles, for example in the context of adaptive light applications in turns, knowledge of a respective steering angle of the motor vehicle is necessary as an input variable. In known adaptive light applications in turns, for example a sensor that determines an absolute steering angle is used to orientate the adaptive light in turns, i.e. a light of headlights when driving in a turn, in a direction intended by a driver. A sensor that detects the absolute steering angle provides an angle of a steering wheel immediately after the motor vehicle is started, whereby the adaptive light in turns is available to the driver once the vehicle starts to move.

Sensors that determine the absolute steering angle are cost-intensive, so that it would be more economical to use a relative steering angle sensor that is already present in all vehicles with power steering or electric steering or EPAS ("Electric Power Assisted Steering") steering. In previously used concepts for relative steering angle sensors, the absolute steering angle value can, however, only be derived from a relative steering angle value, once a steering center offset has been determined. The steering center offset means an offset between a 0° position of the steering wheel and a straight-ahead position of the wheels.

Determining the steering center offset can only be started when the vehicle starts to move, and requires some time to carry out a sufficient number of measurements that are necessary to carry out calibration of the offset, or a calculation of the steering center offset. During an offset calibration period, no calculated absolute steering angles are available for other applications, for example for adaptive headlight control.

In the document U.S. Pat. No. 9,193,386 B2, for example, a last detected absolute steering angle before switching off the motor vehicle is stored and used during a next vehicle start for calculation of a provisional absolute steering angle. In U.S. Pat. No. 6,466,848 B2, an absolute steering angle is calculated based on a relative steering angle and a steering angle center point. In U.S. Pat. No. 9,096,256 B2, an apparatus for measurement of an absolute steering angle and a relative steering angle is used. A similar process is disclosed in US 2009/0125187 A1.

SUMMARY

Against this background, it is technically desirable, even without the requirement for an absolute steering angle sensor already immediately after starting the motor vehicle, to be able to have or to determine a reliable steering angle for other applications.

It is therefore the object of the present disclosure to provide an advantageous method to operate a motor vehicle and an apparatus that estimates a steering angle of a motor vehicle, which in particular provides a reliable steering angle in time to completing a calibration of a steering center offset.

The method according to the disclosure to operate a motor vehicle concerns a motor vehicle comprising a number of wheels. The method according to the disclosure is characterized in that a steering angle $\delta$ is estimated, for example calculated, using a yaw rate or yaw speed $\omega$, a revolution rate of at least one wheel, a wheelbase L and a characteristic speed of the vehicle $v_{ch}$ based on a single-track model. Based on an estimated, for example calculated, steering angle, an application is implemented that requires knowledge of the steering angle of the motor vehicle. This can be for example a method for adaptive light control or adaptive headlight control. In an advantageous version, the steering angle $\delta$ is estimated or calculated using a steering transmission ratio, if this is additionally necessary.

The method according to the disclosure has an advantage that there is an opportunity to estimate or calculate an absolute steering angle value in a gap in time between starting the vehicle with a movement, and an end of a calibration process, in particular a process of calibrating the steering center offset. Thus, applications requiring knowledge of the absolute steering angle, such as for example adaptive headlight control, are available to a driver immediately after starting the vehicle with a movement, although only one relative steering angle sensor is used. With the present disclosure, the related costs can thus be saved.

The steering angle $\delta$ is preferably estimated or calculated using the yaw rate $\omega$, a selected gear i, the wheelbase L, a speed v and the characteristic speed of the vehicle $v_{ch}$ according to the formula $$\delta = \frac{\omega \cdot i \cdot L \cdot \left(1 + \frac{v^2}{vch^2}\right)}{v}$$

In this case, the characteristic speed $v_{ch}$ is determined as a function of a self-steering gradient. The yaw rate describes a speed of a rotary motion of the motor vehicle about a z-axis thereof, i.e. about a vertical axis. A calculation according to said formula has the advantage that it is easy to determine, and uses parameters and input variables that are available immediately after the vehicle starts.

In an advantageous version, a steering center is determined, for example calculated, and the absolute steering angle is determined, for example calculated, using the relative steering angle and the steering center offset. With the steps of the method described above, a reliable steering angle for further applications can be determined and made available until the steering center is determined, or the steering center offset is calibrated. Following successful determination of the steering center, or completion of calibration of the steering center offset, the absolute steering angle can be determined using the relative steering angle and the steering center offset. Said combination of the different methods of determination of the absolute steering angle before and after determining the steering center enables a reliable steering angle to be continuously available immediately from a point in time of starting the motor vehicle with a movement.

In the context of the described method, a sensor that detects the yaw rate or the yaw speed can be used; in addition or alternatively to, a sensor that detects the revolution rate of at least one wheel can be used. Furthermore, a sensor that detects the relative steering angle can be used. Use of said sensors enables necessary parameters to reliably detect the steering angle.

The method according to the disclosure for adaptive light control of a motor vehicle is characterized in that orientation of a light, preferably a light of a headlight, is carried out based on a steering angle estimated according to the already described method. In particular, the steering angle can be estimated, and possibly calculated, based on the aforementioned input variables and based on said calculation formula.

The apparatus according to the disclosure to estimate the steering angle, in particular to calculate the steering angle, of a motor vehicle comprises a sensor that determines the yaw rate and an apparatus that determines the revolution rate of at least one wheel of the motor vehicle. The apparatus is designed to carry out a method that is described above. Advantageously, the apparatus further comprises a device configured to determine the relative steering angle and/or a device configured to determine the steering center offset. The apparatus can in particular comprise a device to calculate the steering center.

The apparatus according to the disclosure for adaptive light control comprises an apparatus that is described above to estimate the steering angle. The motor vehicle according to the disclosure comprises one of the previously described apparatuses. The motor vehicle can be for example a passenger vehicle, a truck or any other motor vehicle.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
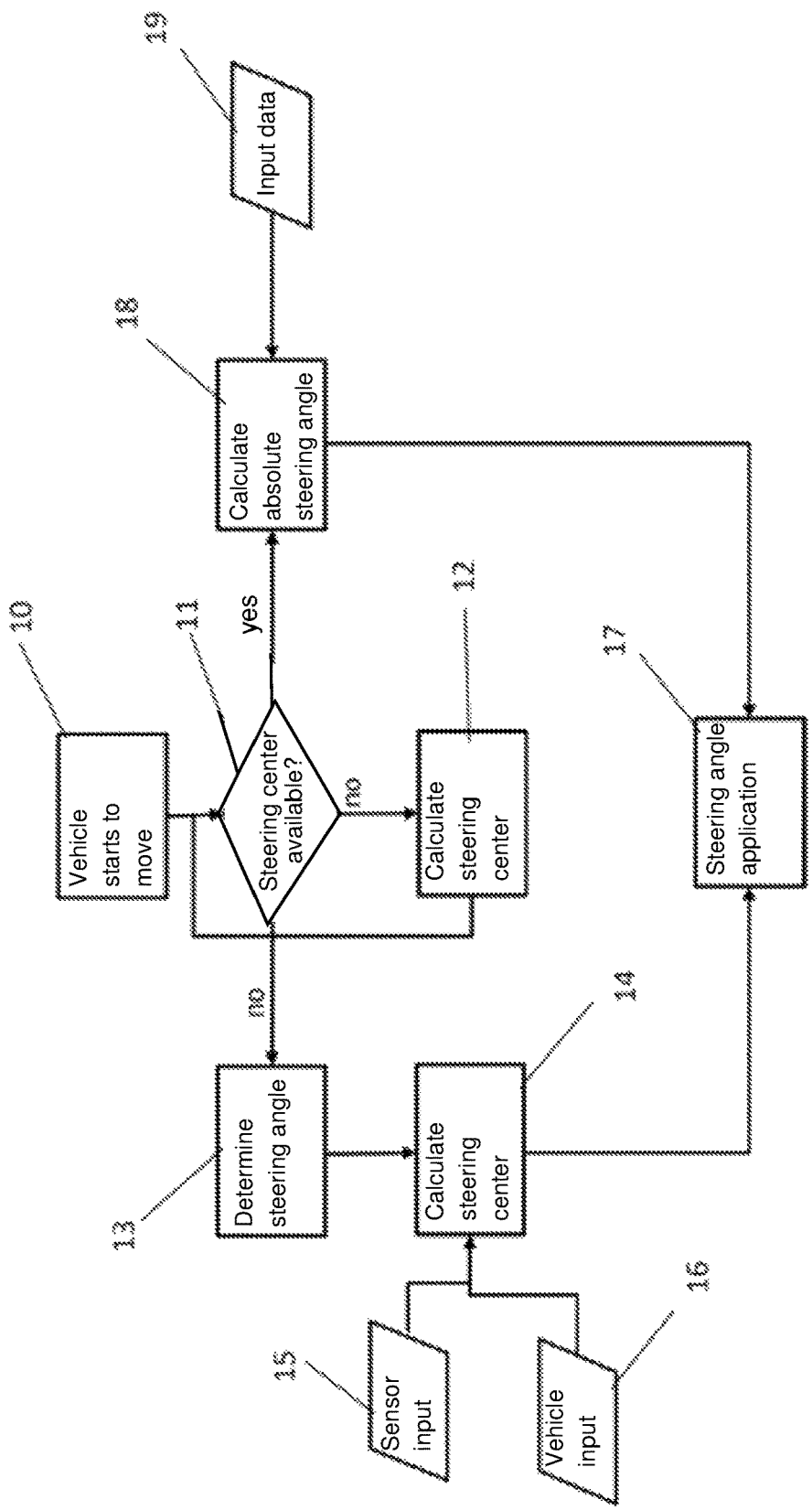
FIG. 1 shows, schematically, logic according to the disclosure in a flow chart.

FIG. 1 shows, schematically, logic for a method or device according to the disclosure in the form of a flow chart. In step 10, the vehicle starts to move. In step 11, a check is carried out as to whether a steering center is available. If a steering center is not available at 11, on the one hand, in step 12, a calculation or calibration of the steering center is thus begun. In step 13, a steering angle is determined or calculated based on a single-track model. For this purpose, sensors 15 for input values of a yaw rate ω and a revolution rate of at least one wheel are made available to the calculation of the steering center in step 14. Furthermore, as vehicle-specific values 16, a wheelbase L, a characteristic speed $v_{ch}$, preferably as a function of a self-steering gradient, and, if necessary, a steering ratio are provided for the calculation of the steering center in step 14.

In the context of the calculation of the steering center in step 14, a steering angle δ can be calculated according to the formula $$\delta=[\omega*i*L*(1+v^2/v_{ch}^2)]/v,$$

wherein i denotes a selected gear and v denotes a speed of the vehicle. The speed v can for example be derived from the revolution rate.

Based on an absolute steering angle determined from the calculation of the steering center in step 14, in step 17 an application based on the steering angle is started and carried out. This can be adaptive light direction control or headlight control, for example.

If the steering center is available in step 11, or is available following a return from step 12 to step 11 following a calculation of the steering center, then the absolute steering angle value is calculated in step 18. For this purpose, a relative steering angle and a steering center offset are used as input data 19. Based on the absolute steering angle thus calculated in step 18, the already described application for adaptive light, or headlight control can be started and carried out or continued in step 17.

Figure 2:
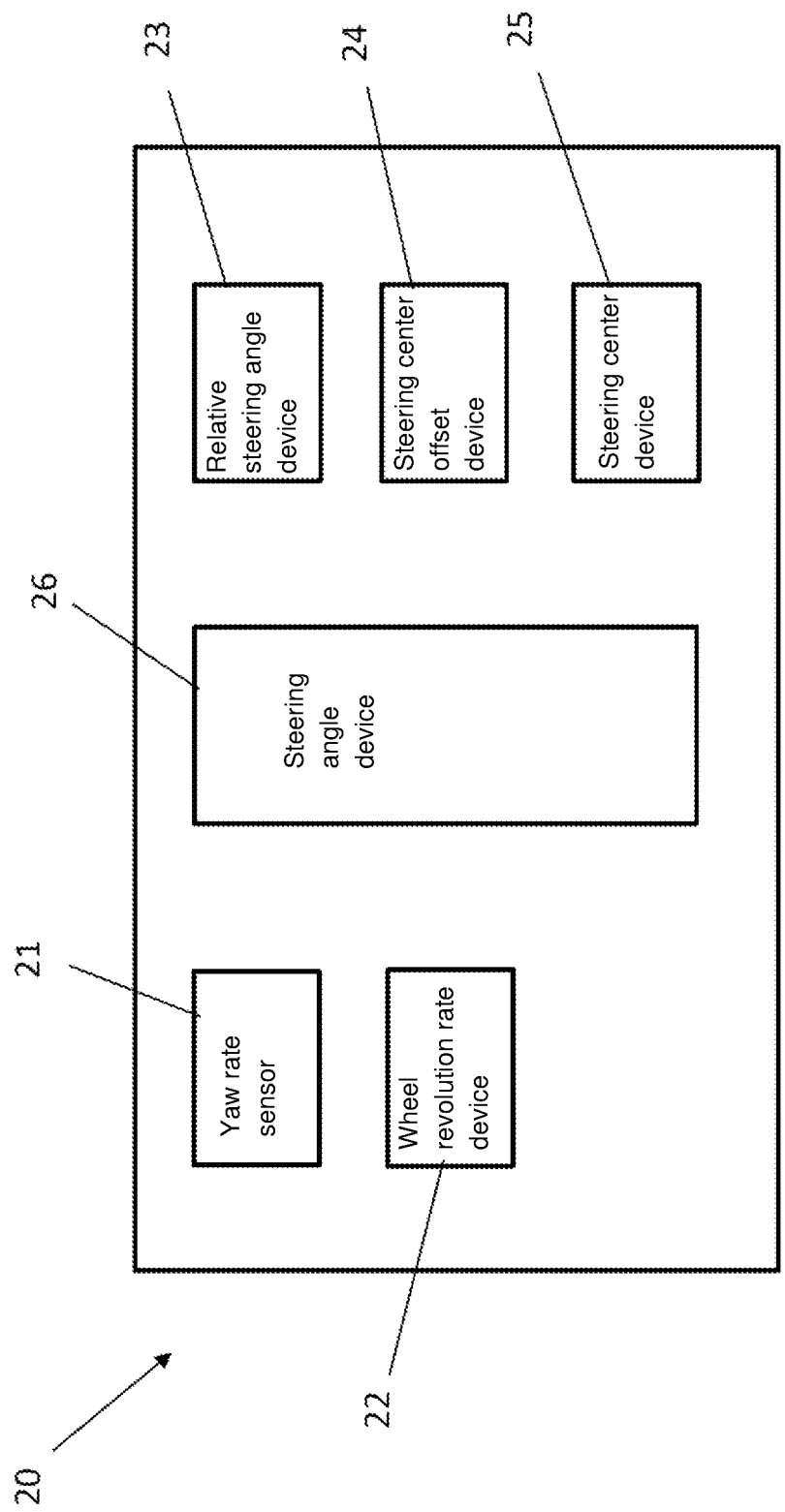
FIG. 2 shows, schematically, an apparatus according to the disclosure to estimate a steering angle of a motor vehicle.

FIG. 2 shows schematically an apparatus according to the disclosure 20 to estimate the steering angle of a motor vehicle 30. The apparatus 20 comprises a sensor 21 that determines the yaw rate and a device 22 that determines the revolution rate of at least one wheel of the motor vehicle 30. Said device is designed to carry out a method that is described above, in particular a method described in connection with FIG. 1. For this, the apparatus 20 shown in FIG. 2 comprises a device 26 that estimates or calculates the steering angle.

The apparatus 20 can optionally comprise a device 23 that determines the relative steering angle and/or a device 24 that determines the steering center offset and/or a device 25 that calculates the steering center. The apparatus according to the disclosure 20 is preferably an apparatus for adaptive light control or light direction control.

Figure 3:
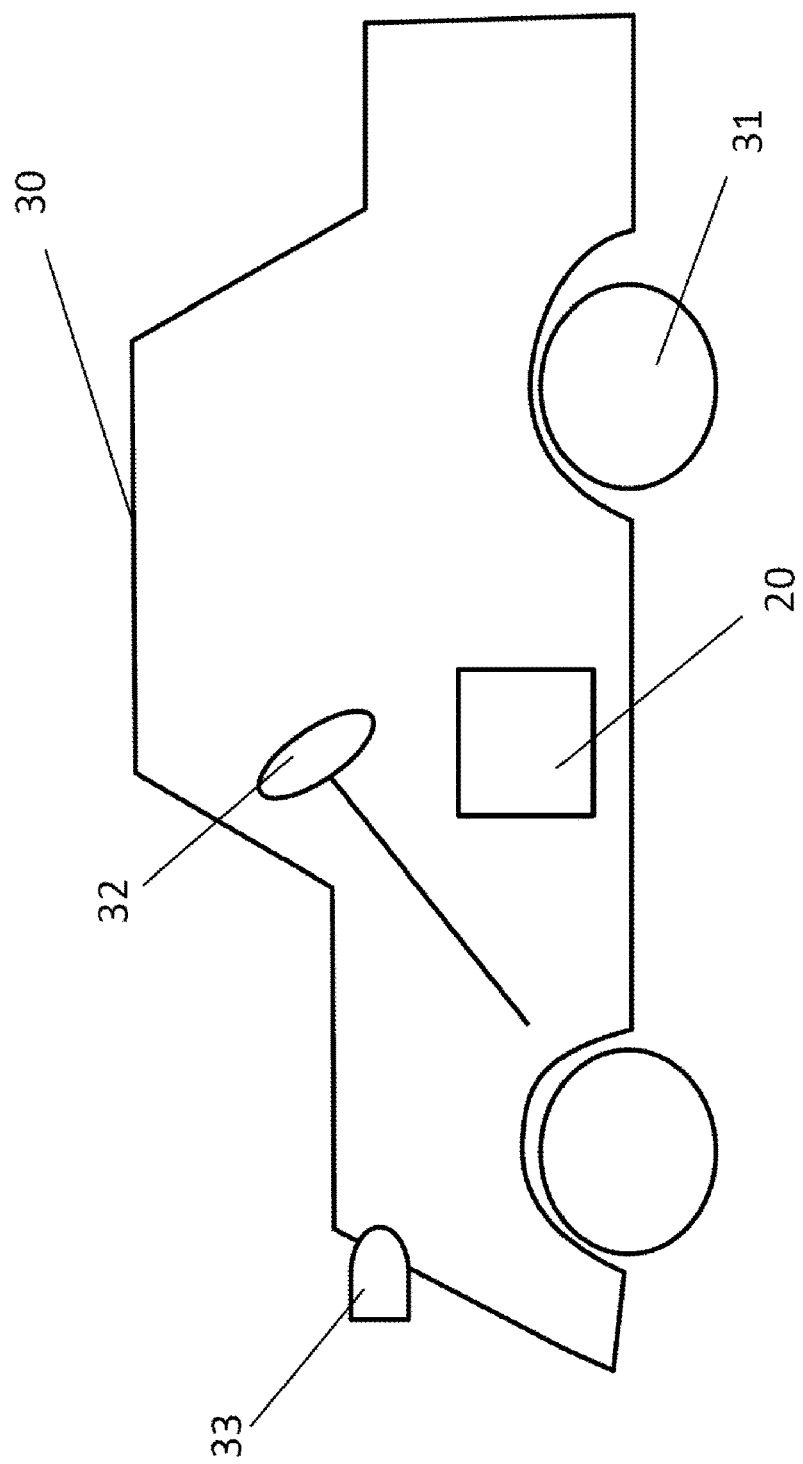
FIG. 3 shows schematically a motor vehicle according to the disclosure.

FIG. 3 shows schematically a motor vehicle according to the disclosure. The motor vehicle according to the disclosure 30 comprises a number of wheels 31, a steering mechanism 32, headlights 33 and an apparatus according to the disclosure 20 that is described above. The apparatus 20 is designed for carrying out the described method, preferably the method described in connection with the logic of FIG. 1. The motor vehicle preferably comprises adaptive headlight control, which can be applied by using the described method and logic shown in FIG. 1.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to operate a motor vehicle comprising:
   estimating a steering angle using a yaw rate, a revolution rate of at least one wheel, a wheelbase and a characteristic speed of the vehicle based on a single-track model, wherein estimating the steering angle calculates the steering angle using the yaw rate, a selected gear, the wheelbase, a speed and the characteristic speed of the vehicle; and applying the steering angle in an adaptive light control system such that an orientation of a head light corresponds to the steering angle.

2. The method as claimed in claim 1, wherein estimating the steering angle uses a steering transmission ratio.

3. The method as claimed in claim 1 further comprising determining a steering center, and calculating an absolute steering angle using a relative steering angle and a steering center offset calculated from the steering center.

4. The method as claimed in claim 3 further comprising using a sensor to detect the yaw rate and a sensor that detects the revolution rate of the at least one wheel and a sensor that detects the relative steering angle.

5. An adaptive light control apparatus for a vehicle comprising:
 a sensor suite that determines a yaw rate and a revolution rate of a wheel; and
 a processor configured to, in response to a calculation of a steering angle using the yaw rate, the revolution rate, a wheelbase and a characteristic speed of the vehicle based on a single-track model, change an orientation of a head light such that the orientation corresponds to the steering angle; and
 wherein the processor is configured to calculate a relative steering angle and determine a steering center offset.

6. The adaptive light control apparatus as claimed in claim 5, wherein the processor is configured to calculate a steering center.

7. A vehicle comprising:
 a processor configured to, in response to a calculation of a steering angle using a yaw rate, a revolution rate, a wheelbase and a characteristic speed of the vehicle based on a single-track model via data from a sensor suite, change an orientation of a light such that the orientation corresponds to the steering angle;
 wherein the processor is further configured to calculate a steering center, and an absolute steering angle using a relative steering angle and a steering center offset calculated from the steering center.

8. The vehicle as claimed in claim 7, wherein the processor is configured to calculate the steering angle with a steering transmission ratio.

9. The vehicle as claimed in claim 7, wherein the processor is configured to calculate the steering angle with the yaw rate, a selected gear, the wheelbase, a speed and the characteristic speed of the vehicle.

10. The vehicle as claimed in claim 7, wherein the light is a headlight of the vehicle.

11. The vehicle as claimed in claim 7, wherein the sensor suite comprises sensors to determine the yaw rate and the revolution rate.

12. The method as claimed in claim 1, wherein the characteristic speed is determined as a function of a self-steering gradient.

13. The adaptive light control apparatus as claimed in claim 5, wherein the processor is further configured to calculate the steering angle using a steering transmission ratio.

14. The adaptive light control apparatus as claimed in claim 5, wherein the processor is further configured to calculate an absolute steering angle using the relative steering angle and the steering center offset.

* * * * *